(12) United States Patent
Iwai et al.

(10) Patent No.: US 10,864,964 B2
(45) Date of Patent: Dec. 15, 2020

(54) BICYCLE SPROCKET ASSEMBLY

(71) Applicant: Shimano Inc., Sakai (JP)

(72) Inventors: Toru Iwai, Sakai (JP); Tetsu Nonoshita, Sakai (JP); Toyoshi Yoshida, Sakai (JP)

(*) Notice: Subject to any disclaimer, the term of this patent is extended or adjusted under 35 U.S.C. 154(b) by 316 days.

(21) Appl. No.: 16/118,474

(22) Filed: Aug. 31, 2018

(65) Prior Publication Data

US 2020/0070934 A1 Mar. 5, 2020

(51) Int. Cl.
*B62M 9/10* (2006.01)
*B62M 9/12* (2006.01)
*F16H 55/30* (2006.01)

(52) U.S. Cl.
CPC ............. *B62M 9/10* (2013.01); *B62M 9/105* (2013.01); *B62M 9/12* (2013.01); *F16H 55/30* (2013.01)

(58) Field of Classification Search
CPC .......... B62M 9/10; B62M 9/105; B62M 9/12; B62M 9/02; B62M 9/04; B62M 9/06; B62M 9/08; B62M 9/085; F16H 55/30; F16H 55/06; F16H 55/12; F16H 55/17
See application file for complete search history.

(56) References Cited

U.S. PATENT DOCUMENTS

| | | | | |
|---|---|---|---|---|
| 5,194,051 A | * | 3/1993 | Nagano | B62M 9/10 474/160 |
| 5,213,550 A | * | 5/1993 | Wu | B62M 9/105 474/160 |
| 8,100,795 B2 | * | 1/2012 | Reiter | B62M 9/10 474/160 |
| 2009/0098966 A1 | * | 4/2009 | Kamada | B62M 9/10 474/160 |
| 2014/0335987 A1 | * | 11/2014 | Iwai | F16H 55/303 474/161 |
| 2015/0210353 A1 | * | 7/2015 | Tokuyama | B62M 9/12 474/160 |
| 2015/0217834 A1 | * | 8/2015 | Iwai | B62M 9/105 474/152 |
| 2016/0114859 A1 | * | 4/2016 | Tsai | F16H 55/30 474/160 |
| 2016/0347410 A1 | * | 12/2016 | Watarai | B62M 9/10 |
| 2017/0057597 A1 | * | 3/2017 | Tokuyama | B62M 9/10 |
| 2018/0229801 A1 | * | 8/2018 | Nishimoto | B62M 9/10 |
| 2018/0237103 A1 | * | 8/2018 | Fujita | F16H 55/30 |
| 2018/0281898 A1 | * | 10/2018 | Iwai | B62M 9/10 |
| 2018/0283520 A1 | * | 10/2018 | Iwai | B62M 9/105 |
| 2018/0297664 A1 | * | 10/2018 | Fukumori | F16H 55/30 |
| 2018/0346064 A1 | * | 12/2018 | Fujita | B60B 27/023 |
| 2018/0346067 A1 | * | 12/2018 | Fujita | F16H 55/30 |
| 2019/0061873 A1 | * | 2/2019 | Fujita | F16H 55/30 |

(Continued)

*Primary Examiner* — Michael R Mansen
*Assistant Examiner* — Raveen J Dias
(74) *Attorney, Agent, or Firm* — United IP Counselors, LLC (57) ABSTRACT

A bicycle rear sprocket assembly 28 comprises a sprocket carrier 31, at least one metallic support 33, and at least one rear sprocket 28a-28h. The sprocket carrier 31 is made of a non-metallic material. The at least one metallic support 33 is attached to at least one of a first circumferentially facing surface 41 and a second circumferentially facing surface 43 of at least one mounting arm 39 of the sprocket carrier 31. The at least one rear sprocket 28a-28h is made of a metallic material. A sprocket body 51 of the at least one rear sprocket 28a-28h is attached to the at least one metallic support 33.

20 Claims, 10 Drawing Sheets

(56) References Cited

U.S. PATENT DOCUMENTS

| | | | |
|---|---|---|---|
| 2019/0084645 A1* | 3/2019 | Emura | F16H 57/0025 |
| 2019/0084646 A1* | 3/2019 | Emura | B62M 9/12 |
| 2019/0092427 A1* | 3/2019 | Oka | B60B 27/04 |
| 2019/0185108 A1* | 6/2019 | Bush | F16H 55/30 |
| 2019/0225301 A1* | 7/2019 | Emura | F16H 55/30 |

* cited by examiner

BICYCLE SPROCKET ASSEMBLY

BACKGROUND

Technical Field

The technology disclosed herein relates to a bicycle sprocket assembly.

Background Information

Bicycling is becoming an increasingly more popular form of recreation as well as a means of transportation. Moreover, bicycling has become a very popular competitive sport for both amateurs and professionals.

Whether the bicycle is used for recreation, transportation or competition, the bicycle industry is constantly improving the various components of the bicycle. One bicycle component that has been extensively redesigned is a bicycle sprocket assembly. The bicycle sprocket assembly is mounted to the bicycle frame, for example, a bicycle hub assembly.

SUMMARY OF THE INVENTION

In accordance with a first aspect of the present invention, a bicycle sprocket assembly comprises a sprocket carrier, at least one metallic support, and at least one sprocket.

The sprocket carrier is made of a non-metallic material. The sprocket carrier includes a central base and at least one mounting arm extending radially outwardly from the central base with respect to a rotational center axis of the bicycle sprocket assembly.

The at least one mounting arm has a first circumferentially facing surface and a second circumferentially facing surface. The second circumferentially facing surface is opposite to the first circumferentially facing surface in a circumferential direction with respect to the rotational center axis.

The at least one metallic support is attached to at least one of the first circumferentially facing surface and the second circumferentially facing surface of the at least one mounting arm.

The at least one sprocket is made of a metallic material. The at least one sprocket includes a sprocket body and a plurality of sprocket teeth. The plurality of sprocket teeth extend radially outwardly from the sprocket body with respect to the rotational center axis. The sprocket body is attached to the at least one metallic support.

With the bicycle sprocket assembly according to the first aspect, the at least one metallic support is attached to at least one of the first and second circumferentially facing surfaces of the at least one mounting arm. The sprocket body is attached to the at least one metallic support.

Thereby, the bicycle sprocket assembly is capable of securing necessary stiffness thereof as well as reducing weight thereof even if the sprocket carrier is made of a non-metallic material.

In accordance with a second aspect of the present invention, the bicycle sprocket assembly according to the first aspect is configured so that the first circumferentially facing surface of the at least one mounting arm faces a reverse direction of a rotational driving direction of the sprocket assembly. The at least one metallic support is attached to the first circumferentially facing surface of the at least one mounting arm.

With the bicycle sprocket assembly according to the second aspect, the at least one metallic support is attached to the first circumferentially facing surface of the at least one mounting arm.

Thereby, the bicycle sprocket assembly is capable of securing necessary stiffness thereof as well as reducing weight thereof even if the sprocket carrier is made of a non-metallic material.

In accordance with a third aspect of the present invention, the bicycle sprocket assembly according to the second aspect is configured so that the second circumferentially facing surface of the at least one mounting arm is free of a metallic support.

With the bicycle sprocket assembly according to the third aspect, the bicycle sprocket assembly is capable of reducing weight thereof and simplifying an assembling process thereof.

In accordance with a fourth aspect of the present invention, the bicycle sprocket assembly according to any one of the first to third aspects is configured so that the at least one mounting arm includes a plurality of mounting arms. The at least one metallic support includes a plurality of metallic supports. Each of the plurality of metallic supports is attached to each of the plurality of mounting arms.

With the bicycle sprocket assembly according to the fourth aspect, the bicycle sprocket assembly is capable of improving stiffness thereof.

In accordance with a fifth aspect of the present invention, the bicycle sprocket assembly according to any one of the first to fourth aspects is configured so that the at least one sprocket includes a plurality of sprockets.

With the bicycle sprocket assembly according to the fifth aspect, it is possible to provide a multistage sprocket assembly as well as reducing weight of the multistage sprocket assembly.

In accordance with a sixth aspect of the present invention, the bicycle sprocket according to the fifth aspect is configured so that the plurality of sprockets include at least one first sprocket and at least one second sprocket.

The at least one first sprocket is made of a first sprocket material. The at least one second sprocket is made of a second sprocket material that is different from the first metallic material.

With the bicycle sprocket assembly according to the sixth aspect, the bicycle sprocket assembly is capable of securing necessary stiffness thereof as well as reducing weight thereof.

In accordance with a seventh aspect of the present invention, the bicycle sprocket assembly according to any one of the first to fifth aspects is configured so that the at least one metallic support includes at least one first metallic support and at least one second metallic support.

The at least one first metallic support is made of a first support material. The at least one second metallic support is made of a second support material that is different from the first support material.

With the bicycle sprocket assembly according to the seventh aspect, the bicycle sprocket assembly is capable of securing necessary stiffness thereof as well as reducing weight thereof.

In accordance with an eighth aspect of the present invention, the bicycle sprocket assembly according to the seventh aspect is configured so that the at least one first metallic support is adjacent to the least one second metallic support in an axial direction with respect to the rotational center axis.

With the bicycle sprocket assembly according to the eighth aspect, the bicycle sprocket assembly is capable of securing necessary stiffness thereof as well as reducing weight thereof.

In accordance with a ninth aspect of the present invention, the bicycle sprocket assembly according to the seventh or eighth aspect is configured so that the plurality of sprockets include at least one first sprocket and at least one second sprocket.

The at least one first sprocket is made of a first sprocket material. The at least one second sprocket is made of a second sprocket material that is different from the first metallic material.

With the bicycle sprocket assembly according to the ninth aspect, the bicycle sprocket assembly is capable of securing necessary stiffness thereof as well as reducing weight thereof.

In accordance with a tenth aspect of the present invention, the bicycle sprocket assembly according to the ninth aspect is configured so that the first sprocket material is identical with the first support material. The second sprocket material is identical with the second support material.

With the bicycle sprocket assembly according to the tenth aspect, the bicycle sprocket assembly is capable of improving a fitting of the first sprocket and the first metallic support. The bicycle sprocket assembly is capable of improving a fitting of the second sprocket and the second metallic support.

In accordance with an eleventh aspect of the present invention, the bicycle sprocket assembly according to the tenth aspect is configured so that the first sprocket material and the first support material include titanium. The second sprocket material and the second support material include iron.

With the bicycle sprocket assembly according to the eleventh aspect, the bicycle sprocket assembly is capable of improving stiffness thereof as well as reducing weight thereof.

In accordance with a twelfth aspect of the present invention, the bicycle sprocket assembly according to the fourth aspect is configured so that the plurality of mounting arms are spaced apart from each other at even intervals in the circumferential direction.

With the bicycle sprocket assembly according to the twelfth aspect, the bicycle sprocket assembly is capable of improving stiffness thereof as well as reducing weight thereof.

In accordance with a thirteenth aspect of the present invention, the bicycle sprocket assembly according to any one of the first to twelfth aspects is configured so that the at least one sprocket is indirectly attached to the sprocket carrier through the at least one metallic support.

With the bicycle sprocket assembly according to the thirteenth aspect, the bicycle sprocket assembly is capable of simplifying an assembling process thereof.

In accordance with a fourteenth aspect of the present invention, the bicycle sprocket assembly according to any one of the first to thirteenth aspects is configured so that the at least one sprocket has an inner periphery defining a sprocket opening.

The at least one sprocket includes at least one radial protrusion. The at least one radial protrusion extends radially inwardly from the inner periphery with respect to the rotational center axis. The at least one radial protrusion is attached to the at least one metallic support.

With the bicycle sprocket assembly according to the fourteenth aspect, the bicycle sprocket assembly is capable of transmitting a pedaling torque from the at least one sprocket to the sprocket carrier.

In accordance with a fifteenth aspect of the present invention, the bicycle sprocket assembly according to the fourteenth aspect is configured so that the at least one radial protrusion includes a plurality of radial protrusions. The plurality of radial protrusions are spaced apart from each other at even intervals in the circumferential direction.

With the bicycle sprocket assembly according to the fifteenth aspect, the bicycle sprocket assembly is capable of securely transmitting a pedaling torque from the at least one sprocket to the sprocket carrier.

In accordance with a sixteenth aspect of the present invention, the bicycle sprocket assembly according to any one of the first to fifteenth aspects is configured so that the at least one of the first circumferentially facing surface and the second circumferentially facing surface of the at least one mounting arm has at least one attachment recess. The at least one metallic support is disposed in the at least one attachment recess.

With the bicycle sprocket assembly according to the sixteenth aspect, the bicycle sprocket assembly is capable of improving stiffness thereof as well as reducing weight thereof.

In accordance with a seventeenth aspect of the present invention, the bicycle sprocket assembly according to any one of the first to sixteenth aspects is configured so that the at least one mounting arm has an internal cavity.

With the bicycle sprocket assembly according to the seventeenth aspect, the bicycle sprocket assembly is capable of further reducing weight thereof.

In accordance with an eighteenth aspect of the present invention, the bicycle sprocket assembly according to any one of the first to seventeenth aspects is configured so that the central base of the sprocket carrier has a hub engagement profile.

With the bicycle sprocket assembly according to the eighteenth aspect, the bicycle sprocket assembly is capable of securely transmitting a pedaling torque from the sprocket carrier to a hub assembly.

In accordance with a nineteenth aspect of the present invention, the bicycle sprocket assembly according to any one of the first to eighteenth aspects is configured so that the sprocket carrier is made of a carbon fiber reinforced plastic.

With the bicycle sprocket assembly according to the nineteenth aspect, the bicycle sprocket assembly is capable of further reducing weight thereof.

In accordance with a twentieth aspect of the present invention, the bicycle sprocket assembly according to any one of the first to nineteenth aspects is configured so that the sprocket body is attached to the at least one metallic support by one of laser welding, adhesive and diffusion bonding.

With the bicycle sprocket assembly according to the twentieth aspect, the bicycle sprocket assembly is capable of further reducing weight thereof since there is no need to use metallic fasteners.

BRIEF DESCRIPTION OF THE DRAWINGS

Referring now to the attached drawings, which form a part of this original disclosure.

DETAILED DESCRIPTION OF PREFERRED EMBODIMENTS

Selected embodiments of the present technology will now be explained with reference to the drawings. It will be apparent to those skilled in the art from this disclosure that the following descriptions of the embodiments of the present technology are provided for illustration only and not for the purpose of limiting the technology as defined by the appended claims and their equivalents.

In this embodiment, the following directional terms "forward", "rearward", "left", "right", "high", "low", "upward" and "downward" as well as any other similar directional terms refer to those directions which are determined on the basis of a rider who sits on a bicycle seat (not shown) of a bicycle with facing a bicycle handlebar (not shown).

Embodiment

[General Configuration of a Bicycle]

Figure 1:
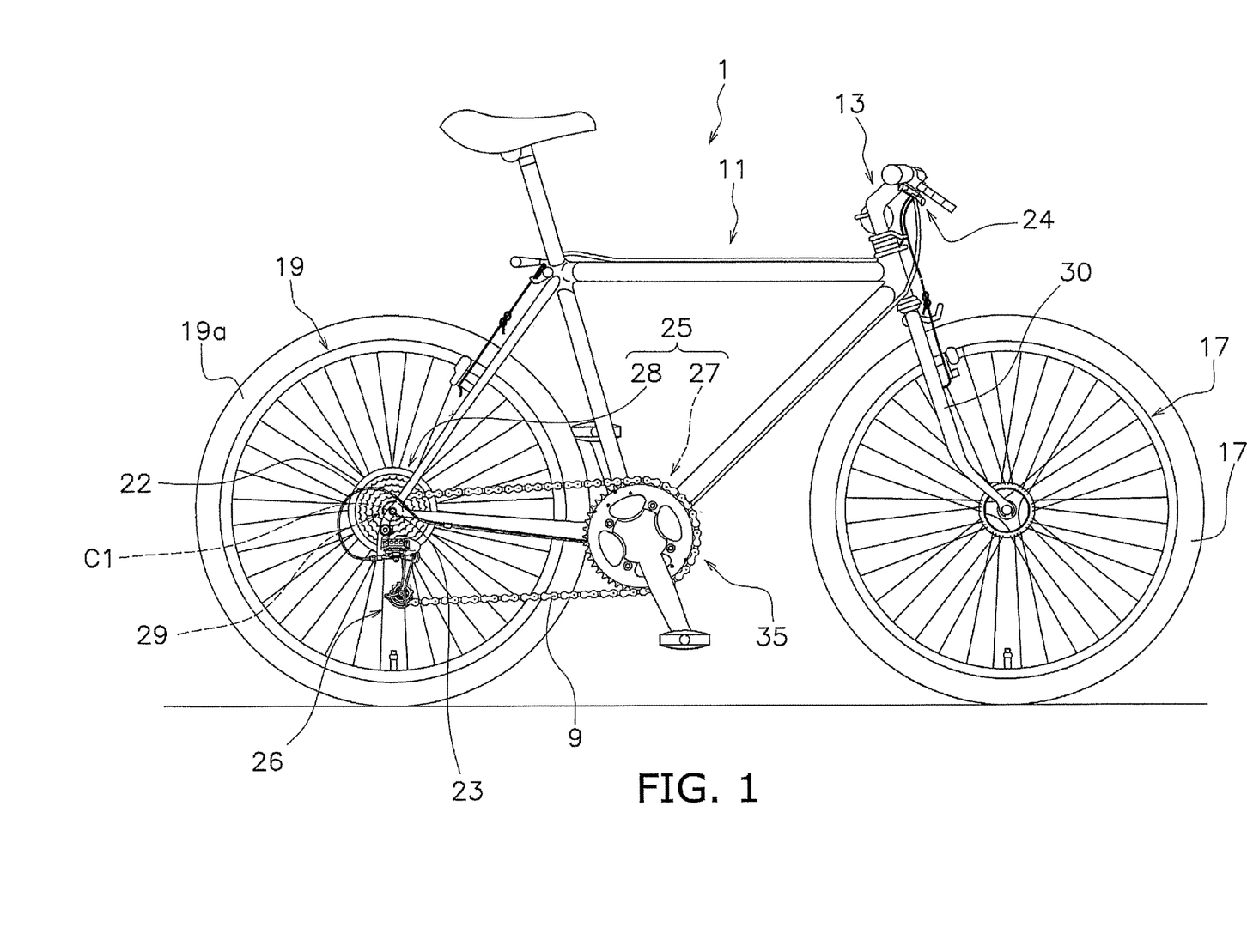
FIG. 1 is a side view of a bicycle according to an embodiment of the present invention.

As shown FIG. 1, a bicycle 1 includes a bicycle chain 9, a frame 11, a handle 13, front and rear wheels 17, 19, a shifting device 24, a drive train 25 and a front fork 30.

The front fork 30 is rotatably attached to the frame 11. The handle 13 is fixed to the front fork 30. The front wheel 17 is rotatably attached to the front fork 30. The rear wheel 19 is rotatably attached to a rear portion of the frame 11 via a rear hub assembly 29. A front tire 17a is attached to the front wheel 17. A rear tire 19a is attached to the rear wheel 19.

The shifting device 24 is attached to the handle 13. The shifting device 24 operates a rear derailleur 26 via a control cable 22. The rear derailleur 26 moves the bicycle chain 9 from one rear sprocket of a bicycle rear sprocket assembly 28 (an example of a bicycle sprocket assembly) to another rear sprocket of the bicycle rear sprocket assembly 28 by a shifting device 24. The rear sprockets are shown by a simplified description in FIG. 1. The rear derailleur 26 is, for example, attached to a rear portion of the frame 11.

The drive train 25 mainly includes a crank assembly 27 and the bicycle rear sprocket assembly 28. Specifically, the drive train 25 mainly includes a crank assembly 27, a rear hub assembly 29, and the bicycle rear sprocket assembly 28. The bicycle chain 9 can also belong to the drive train 25.

The crank assembly 27 is rotatably supported on a lower portion of the frame 11. The crank assembly 27 includes at least one front sprocket 35. In this embodiment, the crank assembly 27 includes a front sprocket 35 which engages with the bicycle chain 9.

The rear hub assembly 29 is mounted on the rear portion of the frame 11. The rear hub assembly 29 supports the bicycle rear sprocket assembly 28.

<Rear Sprocket Assembly>

As shown in FIG. 1, the bicycle rear sprocket assembly 28 is rotatably supported by the rear hub assembly 29. Specifically, the bicycle rear sprocket assembly 28 is rotatably supported by a sprocket supporting portion of the rear hub assembly 29. The sprocket supporting portion is configured to rotate relative to a hub axle 23 of the rear hub assembly 29. The hub axle 23 is mounted to the rear portion of the frame 11.

Figure 2:
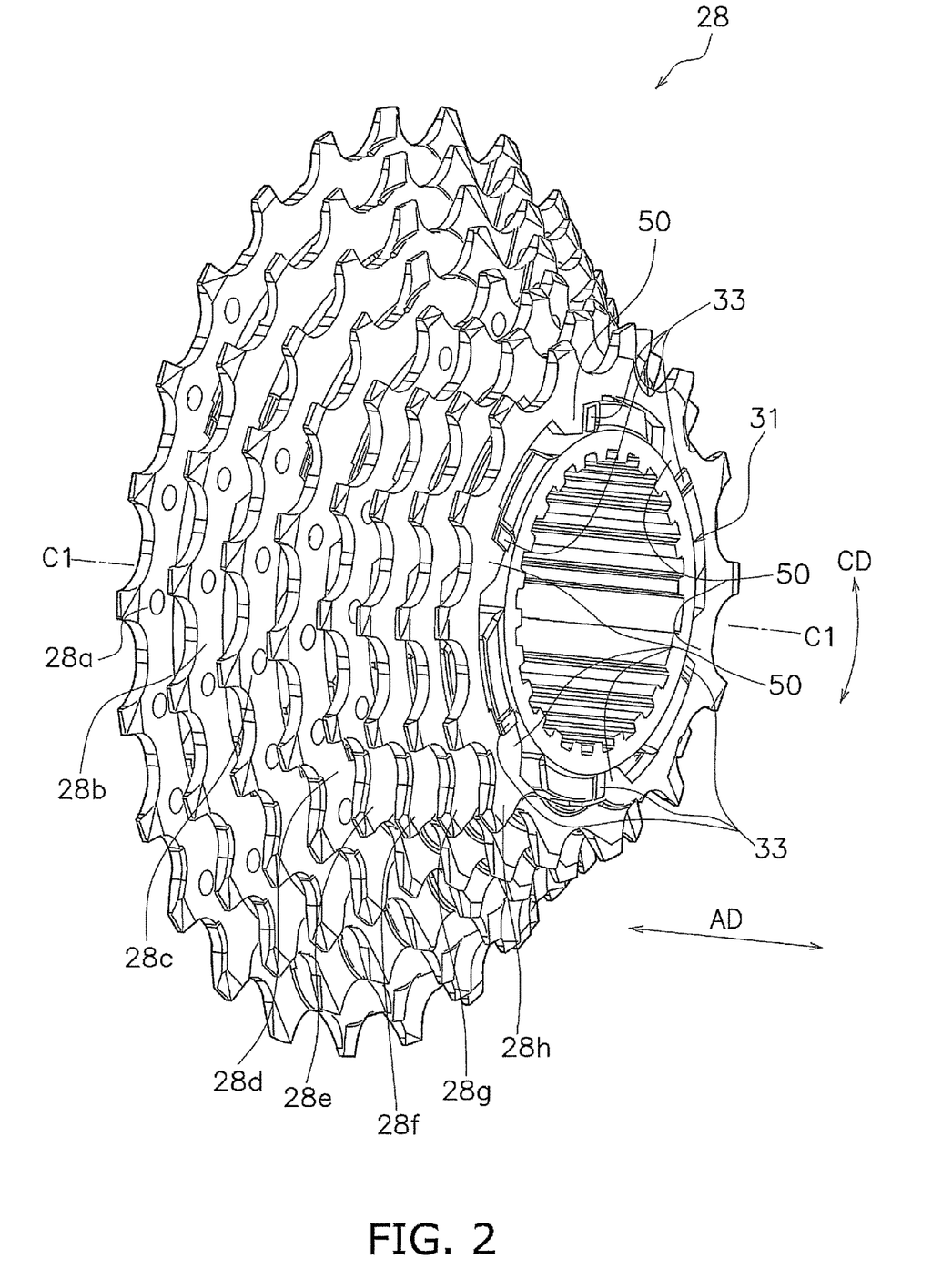
FIG. 2 is a perspective view from outside of the bicycle rear sprocket assembly according to the embodiment of the present invention.

As shown in FIGS. 1 and 2, the bicycle rear sprocket assembly 28 has a rotational center axis C1. The bicycle rear sprocket assembly 28 comprises a sprocket carrier 31, at least one metallic support 33, and at least one rear sprocket 28a-28h.

<Sprocket Carrier>

Figure 3:
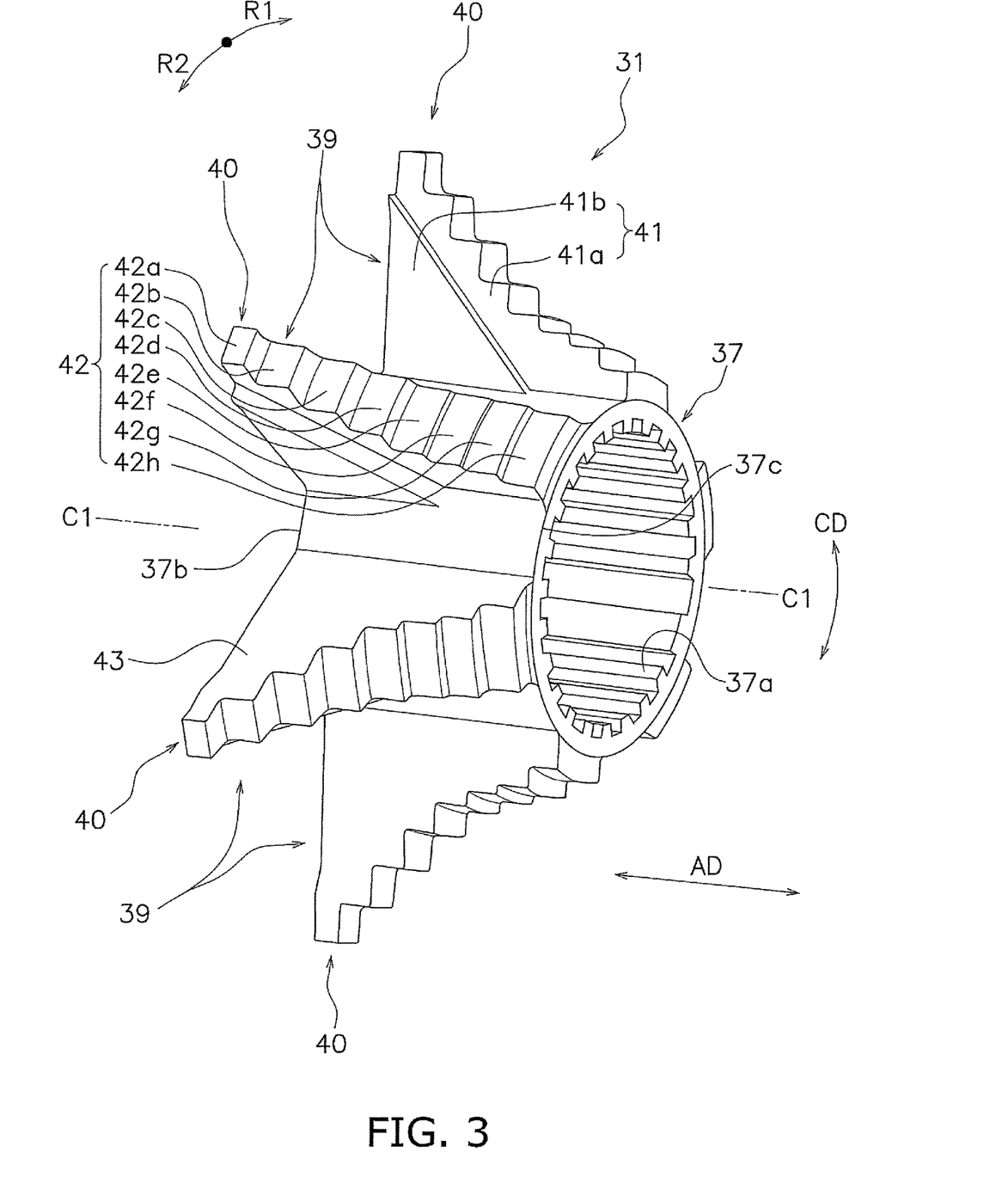
FIG. 3 is a perspective view from front side of a sprocket carrier according to the embodiment of the present invention.

The sprocket carrier 31 is used for holding the at least one rear sprocket 28a-28h. The sprocket carrier 31 is made of a non-metallic material. For example, the sprocket carrier 31 is made of a carbon fiber reinforced plastic. As shown in FIG. 3, the sprocket carrier 31 includes a central base 37 and at least one mounting arm 39.

(Central Base)

As shown in FIG. 3, the central base 37 of the sprocket carrier 31 has a hub engagement profile 37a. For example, the central base 37 is formed in a substantially tubular shape. The central base 37 extends along the rotational center axis C1 of the bicycle rear sprocket assembly 28.

The central base 37 further has a first end portion 37b and a second end portion 37c. The first end portion 37b is a portion which is arranged adjacent to the rear wheel 19 in an axial direction AD with respect to the rotational center axis C1 of the bicycle rear sprocket assembly 28.

The second end portion 37c is a portion which is opposite to the first end portion 37b in the axial direction AD with respect to the rotational center axis C1 of the bicycle rear sprocket assembly 28.

The hub engagement profile 37a is provided on an inner peripheral surface of the central base 37. For example, the hub engagement profile 37a is formed on the inner peripheral surface between the first end portion 37b and the second end portion 37c of the central base 37 in the axial direction AD.

The hub engagement profile 37a engages with the rear hub assembly 29 (see FIG. 1). Specifically, the hub engagement profile 37a engages the rear hub assembly 29 by spline engagement in a mounting state where the bicycle rear sprocket assembly 28 is mounted to the rear hub assembly 29.

(Mounting Arm)

As shown in FIG. 3, the at least one mounting arm 39 extends radially outwardly from the central base 37 with respect to the rotational center axis C1 of the bicycle rear sprocket assembly 28. The at least one mounting arm 39 has a first circumferentially facing surface 41 and a second circumferentially facing surface 43. The at least one mounting arm 39 has an internal cavity 44.

—First Circumferentially Facing Surface—

Figure 4:
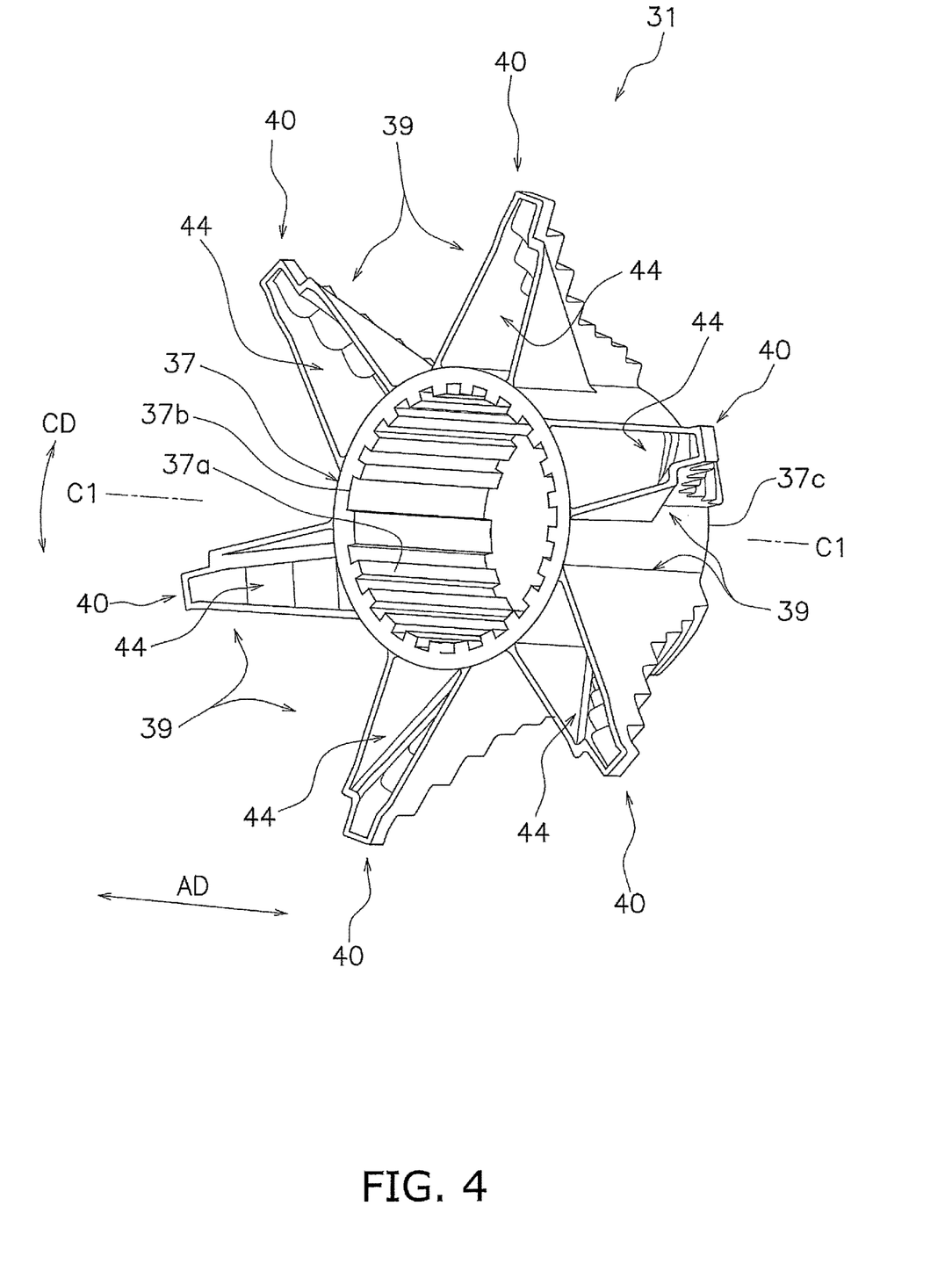
FIG. 4 is a perspective view from back side of the sprocket carrier according to the embodiment of the present invention.

As shown in FIGS. 3 and 4, the at least one of the first circumferentially facing surface 41 and the second circumferentially facing surface 43 of the at least one mounting arm 39 has at least one attachment recess 41a. In this embodiment, the first circumferentially facing surface 41 has at least one attachment recess 41a.

For example, the at least one mounting arm 39 includes a plurality of mounting arms 39. Each of the plurality of mounting arms 39 extends radially outwardly from the central base 37 with respect to the rotational center axis C1 of the bicycle rear sprocket assembly 28.

The plurality of mounting arms 39 are spaced apart from each other at even intervals in the circumferential direction CD with respect to the rotational center axis C1 of the bicycle rear sprocket assembly 28.

The plurality of mounting arms 39 is disposed at an interval from each other in the circumferential direction CD with respect to the rotational center axis C1 of the bicycle rear sprocket assembly 28. Specifically, the plurality of mounting arms 39 is equally disposed at the interval from each other in the circumferential direction CD.

As shown in FIG. 3, each of the plurality of mounting arms 39 has an arm body 40, a plurality of mounting portions 42, the first circumferentially facing surface 41, the second circumferentially facing surface 43. Preferably, as shown in FIG. 4, each of the plurality of mounting arms 39 has the internal cavity 44.

The arm body 40 extends radially outwardly from the central base 37 with respect to the rotational center axis C1 of the bicycle rear sprocket assembly 28.

The arm body 40 is integrally formed with the central base 37. For example, the arm body 40 protrudes from the central base 37 so that a radial height thereof decreases from the first end portion 37b of the central base 37 toward the second end portion 37c of the central base 37. The arm body 40 can be a separate member from the central base 37.

The plurality of mounting portions 42 mount the bicycle rear sprocket assembly 28 thereon. The plurality of mounting portions 42 are provided on the arm body 40.

For example, the plurality of mounting portions 42 includes a first to eighth mounting portions 42a-42h. The first to eighth mounting portions 42a-42h respectively mount the at least one rear sprocket, for example, first to eighth rear sprockets 28a-28h (see FIG. 1). However, a total number of the plurality of mounting portions 42 is not limited to this embodiment. The total number of the plurality of mounting portions 42 can be smaller than or larger than eight.

The first to eighth mounting portions 42a-42h are respectively provided on a radially outer peripheral portion of the arm body 40 with respect to the rotational center axis C1 of the bicycle rear sprocket assembly 28.

The first mounting portion 42a is formed on the radially outer peripheral portion of the arm body 40 at the first end portion's 37b side of the central base 37. The eighth mounting portion 42h is formed on the radially outer peripheral portion of the arm body 40 at the second end portion's 37c side of the central base 37.

The second to seventh mounting portions 42b-42g are respectively formed on the radially outer peripheral portion of the arm body 40 between the first mounting portion 42a and the eighth mounting portion 42h in the axial direction AD with respect to the rotational center axis C1.

The first to eighth mounting portions 42a-42h are arranged adjacent to each other in the order of the first to eighth mounting portions 42a-42h from the first end portion 37b of the central base 37 toward the second end portion 37c of the central base 37.

A radial height of the first mounting portion 42a is the largest height among the first to eighth mounting portions 42a-42h. A radial height of the eighth mounting portion 42h is the smallest height among the first to eighth mounting portions 42a-42h. Radial height of the second to seventh mounting portions 42b-42g gradually decrease in the order of the second to seventh mounting portions 42b-42g.

For example, the above radial height is defined by a distance between the rotational center axis C1 and the radially outermost surface of each of the first to eighth mounting portions 42a-42h.

As shown in FIG. 3, the first circumferentially facing surface 41 of the at least one mounting arm 39 faces a reverse direction R2 of a rotational driving direction R1 of the bicycle rear sprocket assembly 28.

In this embodiment, the first circumferentially facing surface 41 of each of the plurality of mounting arm 39 faces a reverse direction R2 of a rotational driving direction R1 of the bicycle rear sprocket assembly 28.

The rotational driving direction R1 is a direction in which the bicycle rear sprocket assembly 28 rotates around the rotational center axis C1 when driving force is transmitted from the bicycle chain 9 to the bicycle rear sprocket assembly 28 during pedaling.

The first circumferentially facing surface 41 is provided on the arm body 40. The first circumferentially facing surface 41 forms one side surface of two side surfaces of the arm body 40. The one side surface of the arm body 40 faces the reverse direction R2.

The first circumferentially facing surface 41 includes a circumferentially outer surface 41b and the at least one attachment recess 41a. In this embodiment, the first circumferentially facing surface 41 includes the circumferentially outer surface 41b and the attachment recess 41a.

The circumferentially outer surface 41b is a surface which faces the reverse direction R2 and is exposed. The attachment recess 41a is formed by being recessed from the outer surface in a circumferential direction CD with respect to the rotational center axis C1.

Figure 5:
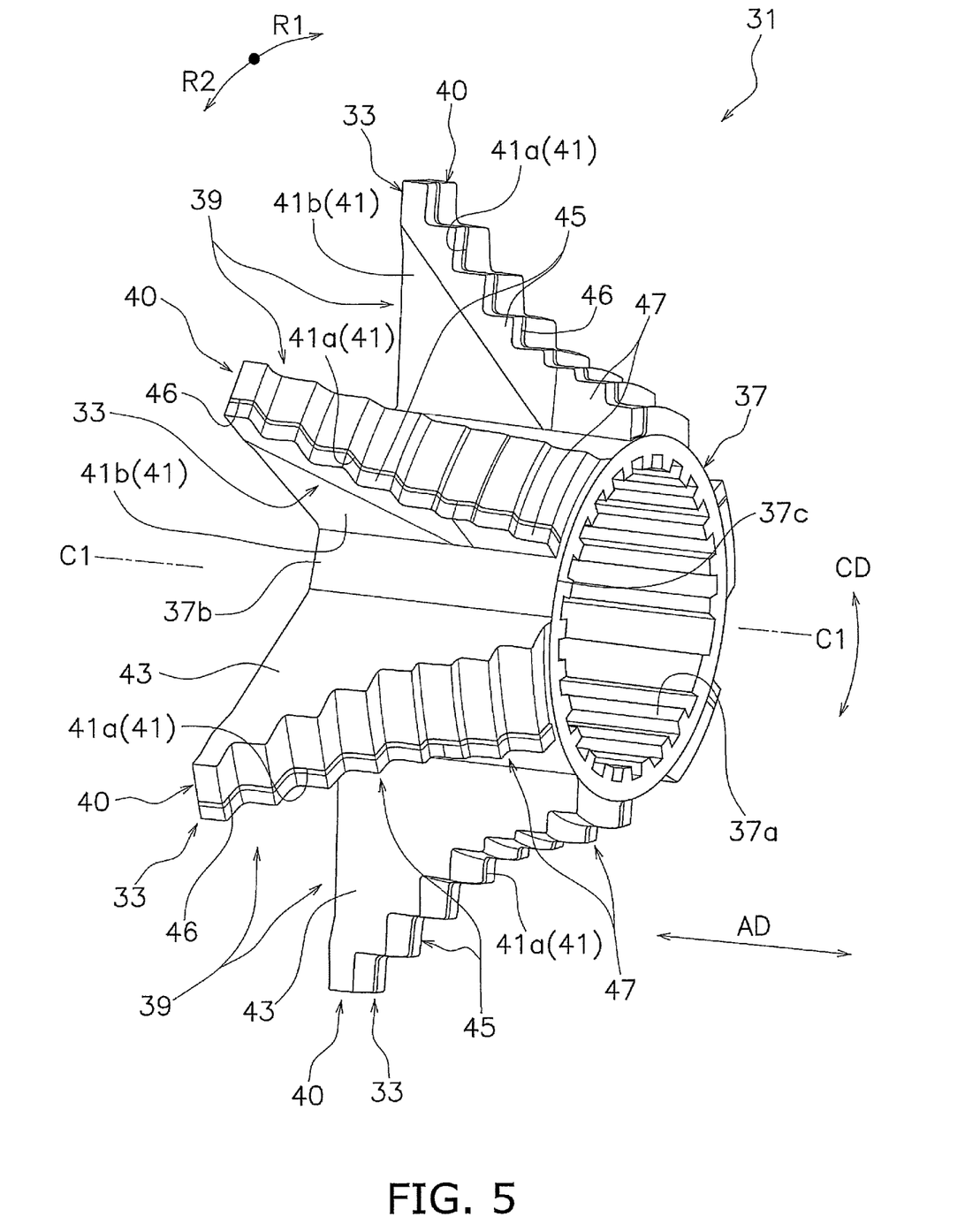
FIG. 5 is a perspective view from front side of the sprocket carrier and a metallic support according to the embodiment of the present invention.

A bottom surface of the attachment recess 41a faces the reverse direction R2. The bottom surface of the attachment recess 41a extends to the first to eighth mounting portions 42a-42h on a radially outer side thereof. As shown in FIG. 5, the at least one metallic support 33 is disposed on the first circumferentially facing surface 41, for example, the bottom surface of the attachment recess 41a.

As shown in FIG. 5, a plurality of the metallic supports 33 is preferably disposed on all the first circumferentially facing surface 41. However, at least one of the first circumferentially facing surface 41 can be free of the metallic support 33 as long as the metallic support 33 is disposed on at least one of the first circumferentially facing surface 41.

—Second Circumferentially Facing Surface—

As shown in FIG. 3, the second circumferentially facing surface 43 of the at least one mounting arm 39 is opposite to the first circumferentially facing surface 41 in a circumferential direction CD with respect to the rotational center axis C1.

In this embodiment, the second circumferentially facing surfaces 43 of the plurality of mounting arm 39 each face the rotational driving direction R1 of the bicycle rear sprocket assembly 28.

For example, the second circumferentially facing surface 43 is provided on the arm body 40. Specifically, the second circumferentially facing surface 43 forms the other side surface of the two side surfaces of the arm body 40 with respect to the first circumferentially facing surface 41. The other side surface of the arm body 40 faces the rotational driving direction R1.

The second circumferentially facing surface 43 of the at least one mounting arm 39 is free of the metallic support 33. In this embodiment, the second circumferentially facing surfaces 43 of the plurality of mounting arms 39 are each free of the metallic support 33. In other words, the second circumferentially facing surface 43 forms a circumferentially facing surface of the mounting arm 39 without any metallic support.

However, the metallic support 33 can be disposed on at least one of the second circumferentially facing surface 43. A plurality of metallic supports 33 can be disposed on all the second circumferentially facing surfaces 43.

—Internal Cavity—

As shown in FIG. 4, the internal cavity 44 is preferably provided in the arm body 40 for the purpose of weight-saving. The internal cavity 44 is formed to extend in the axial direction AD from the first end portion's 37b side of the central base 37 toward the second end portion's 37c side of the central base 37.

<Metallic Support>

As shown in FIG. 5, the at least one metallic support 33 is attached to the at least one mounting arm 39. Specifically, the at least one metallic support 33 is attached to at least one of the first circumferentially facing surface 41 and the second circumferentially facing surface 43 of the at least one mounting arm 39. Namely, the at least one metallic support 33 can be attached to the first circumferentially facing surface 41.

Alternatively, the at least one metallic support 33 can be attached to the second circumferentially facing surface 41. The at least one metallic support 33 can also be attached to both of the first circumferentially facing surface 41 and the second circumferentially facing surface 43 of the at least one mounting arm 3.

In this embodiment, the at least one metallic support 33 is attached to the first circumferentially facing surface 41 of the at least one mounting arm 39. For example, the at least one metallic support 33 is disposed in the at least one attachment recess 41a (see FIG. 3). The at least one metallic support 33 is attached in the at least one attachment recess 41a, for example, the bottom surface of the at least one attachment recess 41a so that the at least one metallic support 33 is substantially flush with the circumferentially outer surface 41b of the first circumferentially facing surface 41. Alternatively, a step can be formed between the at least one metallic support 33 and the circumferentially outer surface 41b of the first circumferentially facing surface 41.

The at least one metallic support 33 includes a plurality of metallic supports 33. Each of the plurality of metallic supports 33 is attached to each of the plurality of mounting arms 39.

As shown in FIG. 5, the at least one metallic support 33 includes at least one first metallic support 45 and at least one second metallic support 47. The at least one first metallic support 45 is made of a first support material. The at least one second metallic support 47 is made of a second support material that is different from the first support material.

The at least one first metallic support 45 is adjacent to the least one second metallic support 47 in an axial direction AD with respect to the rotational center axis C1.

In this embodiment, each of the plurality of metallic support 33 includes the first metallic support 45 and the second metallic support 47. For example, the first support material include titanium. For example, the second support material include iron.

The first metallic support 45 is adjacent to the second metallic support 47 in an axial direction AD with respect to the rotational center axis C1. In this state, the first metallic support 45 is attached to each of the plurality of mounting arms 39, for example, the first circumferentially facing surface 41 of each of the plurality of mounting arms 39.

The first metallic support 45 is attached to the attachment recess 41a of the first circumferentially facing surface 41, for example, the bottom surface of the attachment recess 41a of the first circumferentially facing surface 41, by adhesive. The portion of an attachment means is indicated with a reference numeral 46 in FIG. 5.

The second metallic support 47 is attached to each of the plurality of mounting arms 39, for example, the first circumferentially facing surface 41 of each of the plurality of mounting arms 39.

The second metallic support 47 is attached to the attachment recess 41a of the first circumferentially facing surface 41, for example, the bottom surface of the attachment recess 41a of the first circumferentially facing surface 41, by adhesive.

Figure 6:
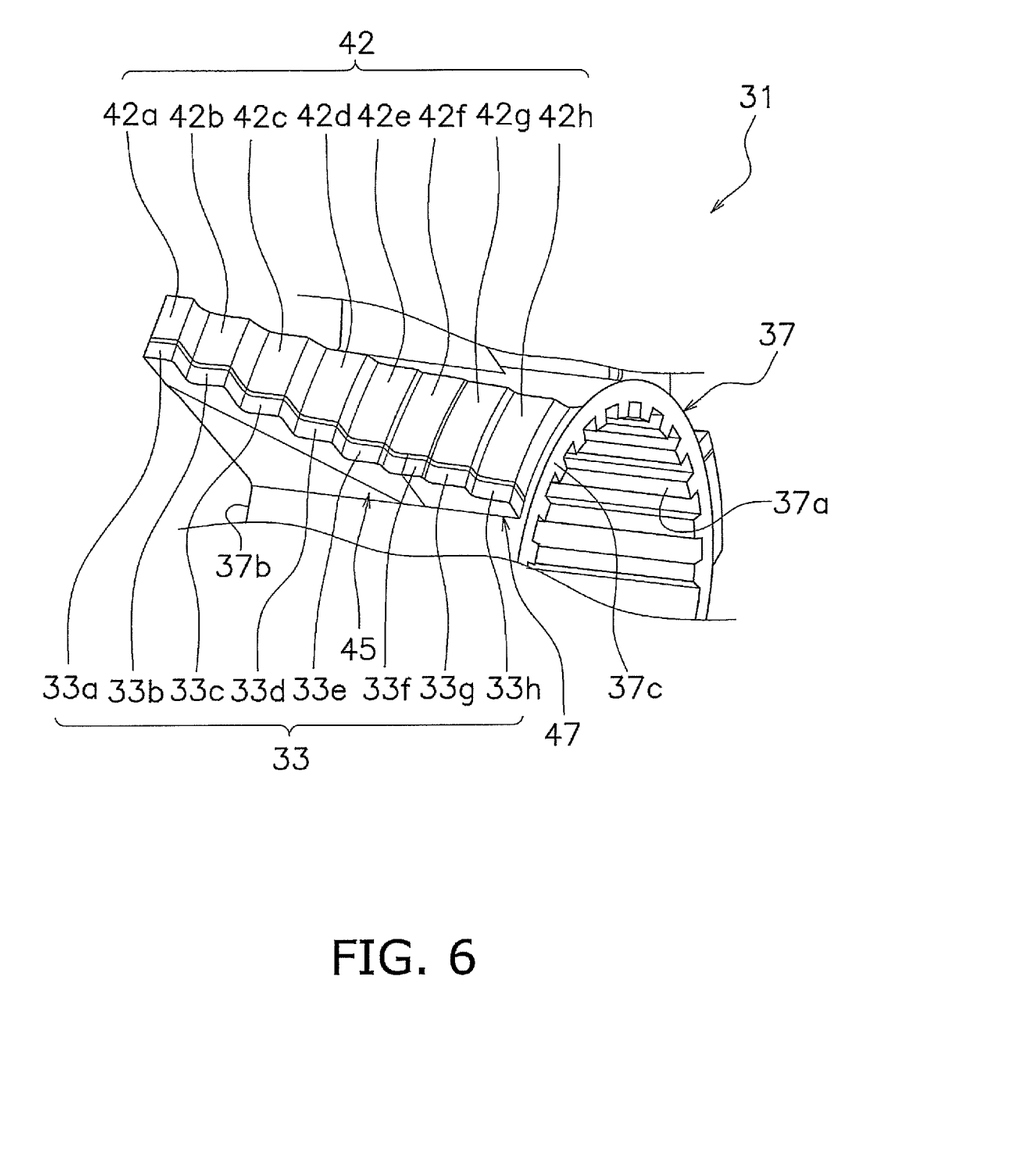
FIG. 6 is a partially enlarged perspective view from front side of the sprocket carrier and a metallic support according to the embodiment of the present invention.

As shown in FIG. 6, the first metallic support 45 includes first to fifth step portions 33a-33e. The first to fifth step portions 33a-33e respectively face inner peripheries of the first to fifth rear sprockets 28a-28e (see FIGS. 2 and 7).

The first to fifth step portions 33a-33e are formed in a substantially stepped form. A bottom surface of each of the first to fifth step portions 33a-33e extends along the axial direction AD with respect to the rotational center axis C1.

The bottom surface of each of the first to fifth step portions 33a-33e is formed so as to be gradually close to the rotational center axis C1 in the axial direction AD from the first end portion's 37b side of the central base 37 toward the second end portion's 37c side of the central base 37.

The second metallic support 47 includes sixth to eighth step portions 33f-33h. The sixth to eighth step portions 33f-33h respectively face inner peripheries of the sixth to eighth rear sprockets 28f-28h (see FIGS. 2 and 7) in a radial direction RD with respect to the rotational center axis C1.

The sixth to eighth step portions 33f-33h are formed in a substantially stepped form. A bottom surface of each of the sixth to eighth step portions 33f-33h extends along the axial direction AD with respect to the rotational center axis C1.

The bottom surface of each of the sixth to eighth step portions 33f-33h is formed so as to be gradually close to the rotational center axis C1 in the axial direction AD from the first end portion's 37b side of the central base 37 toward the second end portion's 37c side of the central base 37.

In the above-mentioned embodiment, the at least one metallic support 33 includes at least one first metallic support 45 and at least one second metallic support 47. However, the present invention is not limited to this embodiment. For, example, the metallic support 33 can be formed as a unitary one-piece member. Further, the metallic support 33 can be formed three or more metallic support members.

<Rear Sprocket>

Figure 7:
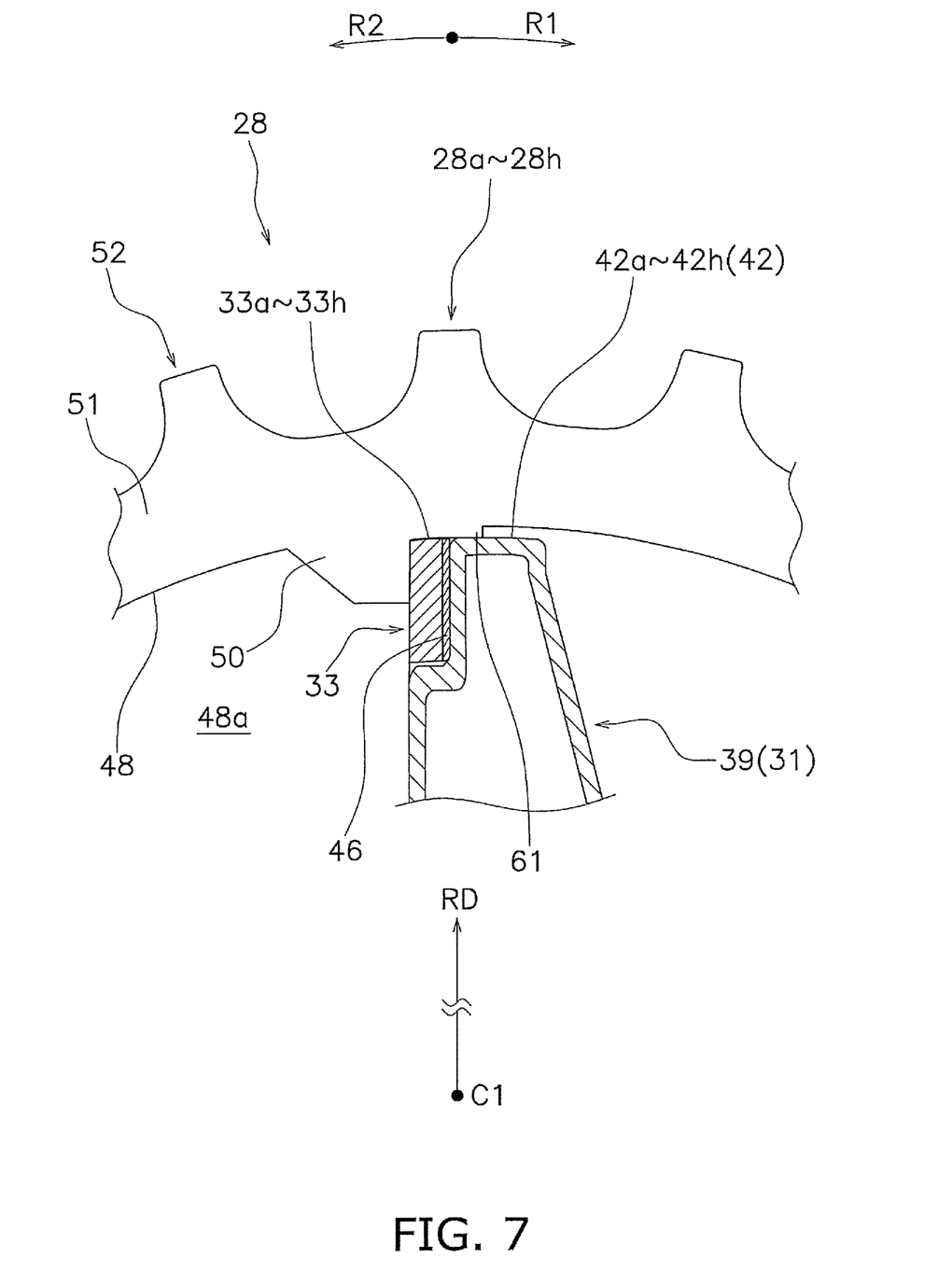
FIG. 7 is a partially enlarged cross-sectional view from front side of the bicycle rear sprocket assembly according to the embodiment of the present invention.

As shown in FIGS. 2 and 7, the at least one rear sprocket 28a-28h is indirectly attached to the sprocket carrier 31 through the at least one metallic support 33. The at least one rear sprocket is made of a metallic material.

Specifically, as shown in FIG. 7, the at least one rear sprocket 28a-28h has the inner periphery 48 defining a sprocket opening 48a. The at least one rear sprocket 28a-28h includes at least one radial protrusion 50. The at least one radial protrusion 50 extends radially inwardly from the inner periphery 48 with respect to the rotational center axis C1. The at least one radial protrusion 50 is attached to the at least one metallic support 33.

The at least one rear sprocket 28a-28h includes at least one positioning protrusion 61. The at least one positioning protrusion 61 extends radially inwardly from the inner periphery 48 with respect to the rotational center axis C1. The at least one positioning protrusion 61 is mounted to the at least one metallic support 33 and the mounting portion 42 of the sprocket carrier 31.

For example, as shown in FIGS. 2 and 7, the at least one radial protrusion includes a plurality of radial protrusions 50. The plurality of radial protrusions 50 are spaced apart from each other at even intervals in the circumferential direction CD. The plurality of radial protrusions 50 respectively extend radially inwardly from the inner periphery 48 with respect to the rotational center axis C1.

Each of the plurality of radial protrusions 50 is attached to each of the plurality of metallic supports 33. Each of the plurality of metallic supports 33 is attached to each of the plurality of mounting arms 39 of the sprocket carrier 31 as described above.

The at least one rear sprocket 28a-28h includes a sprocket body 51 and a plurality of sprocket teeth 52. The sprocket body 51 is attached to the at least one metallic support 33. For example, the sprocket body 51 is attached to the at least one metallic support 33 by one of laser welding, adhesive and diffusion bonding.

In this embodiment, the at least one rear sprocket includes a plurality of rear sprockets 28a-28h. The plurality of rear sprockets includes the first to eighth rear sprockets 28a-28h. However, the present invention is not limited to this embodiment. A total number of the plurality of rear sprockets can vary according to need.

The first rear sprocket 28a has the largest outer diameter among the first to eighth rear sprockets 28a-28h. The eighth rear sprocket 28h has the smallest outer diameter among the first to eighth rear sprockets. The second to seventh rear sprockets 28b-28g respectively have outer diameters which gradually decreases in the order of the second to seventh rear sprockets 28a-28h.

The plurality of rear sprockets include the first to fifth rear sprockets 28a-28e. The first to fifth rear sprockets 28a-28e is made of a first sprocket material. The first to fifth rear sprockets 28a-28e is an example of at least one first sprocket in claims. The first sprocket material is identical with the first support material. For example, the first sprocket material includes titanium.

The plurality of rear sprockets include the sixth to eighth rear sprockets 28f-28h. The sixth to eighth rear sprockets 28f-28h is made of a second sprocket material that is different from the first metallic material. The sixth to eighth rear sprockets 28f-28h is an example of at least one second sprocket in claims. The second sprocket material is identical with the second support material. For example, the second sprocket material includes iron.

Each of the first to eighth rear sprockets 28a-28h includes the sprocket body 51 and the plurality of sprocket teeth 52. The plurality of sprocket teeth 52 extends radially outwardly from the sprocket body 51 with respect to the rotational center axis C1.

Each of the first to eighth rear sprockets 28a-28h further includes the inner periphery 48. Each of the first to eighth rear sprockets 28a-28h further includes the plurality of radial protrusions 50.

The sprocket body 51 is formed in a substantially annular shape. An inner periphery of the sprocket body 51 forms the inner periphery 48 of each of the first to eighth rear sprocket 28a-28h. The inner periphery 48, for example, each of the positioning protrusions 61, is mounted on each of the first to eighth step portions 33a-33h and each of the first to eighth mounting portions 42a-42h.

The sprocket body 51 is attached to each of the plurality of metallic supports 33 by one of laser welding, adhesive and diffusion bonding. Specifically, the sprocket body 51 includes the plurality of radial protrusions 50. Each of the plurality of radial protrusions 50 extends radially inwardly from the inner periphery 48 of the sprocket body 51 with respect to the rotational center axis C1.

Each of the plurality of radial protrusions 50 abuts to each of the plurality of metallic supports 33 in the rotational driving direction R1.

In this state, each of the plurality of radial protrusions 50 is attached to each of the plurality of metallic supports 33 by one of laser welding, adhesive and diffusion bonding. In this embodiment, the radial protrusion 50 is attached to each of the plurality of metallic supports 33 by adhesive. The portion of the attachment means is indicated with a reference numeral 46 in FIG. 7.

Variation of the Embodiment

As a variation of the above embodiment, the bicycle rear sprocket assembly 28 can be configured as follows.

(A1) In the above embodiments, explanation is performed as an example that the mounting arms 39 has the internal cavity 44 (see FIG. 4). Instead of this, the plurality of mounting arms 39 can be configured without the internal cavity 44.

(A2) In the above embodiments, explanation is performed as an example that each of the first to eighth rear sprockets 28a-28h, for example, the inner periphery 48 of each of the first to eighth rear sprockets 28a-28h, is mounted on each of the first to eighth mounting portions 42a-42h without an attachment means.

Figure 8:
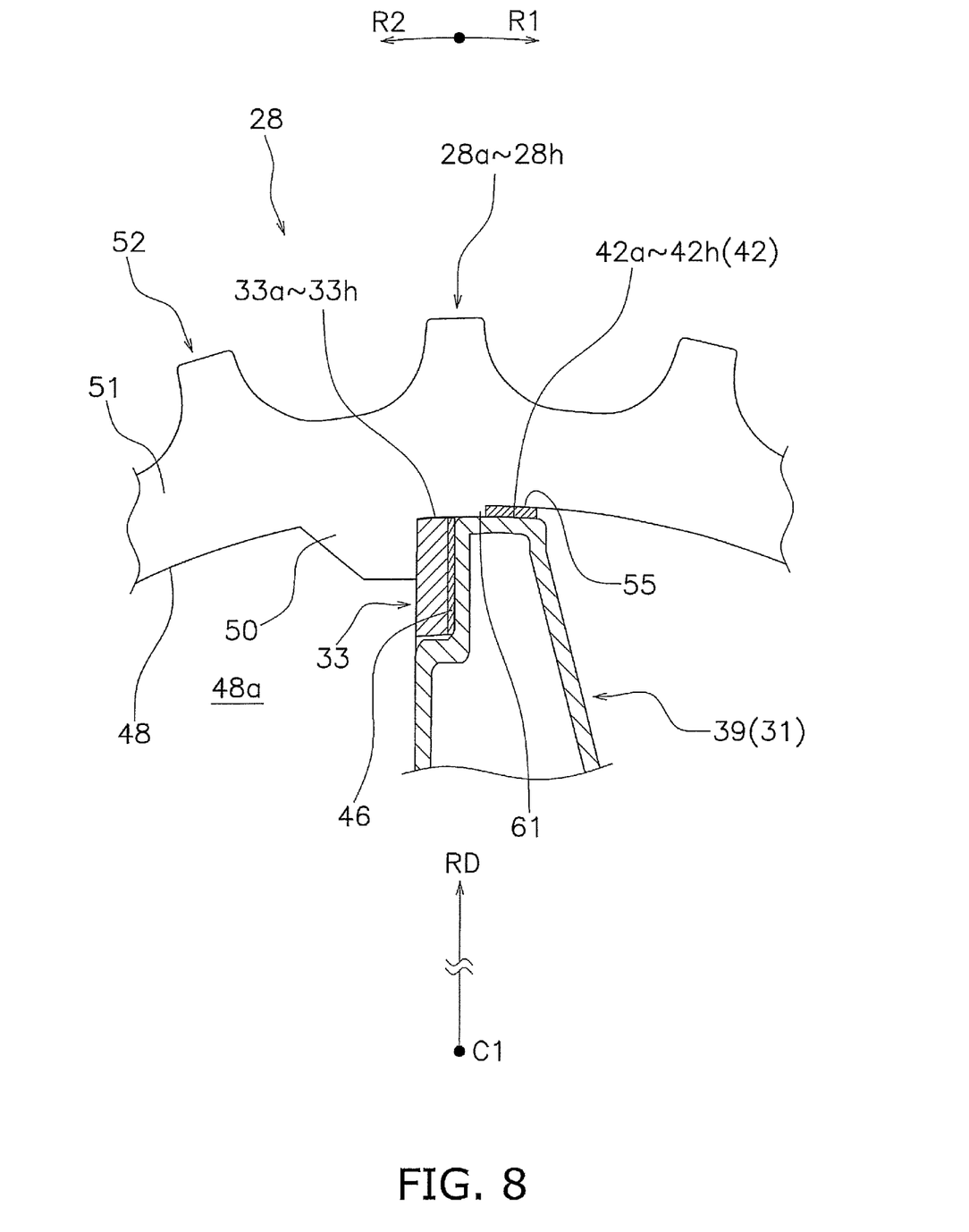
FIG. 8 is a partially enlarged cross-sectional view from front side of the bicycle rear sprocket assembly as a variation of the embodiment of the present invention.

Instead of this, as shown in FIG. 8, each of the first to eighth rear sprockets 28a-28h, for example, the inner periphery 48 of each of the first to eighth rear sprockets 28a-28h, is attached to each of the first to eighth mounting portions 42a-42h by the attachment means, for example, by adhesive. The portion of the attachment means is indicated with a reference numeral 55 in FIG. 8.

(A3) In the above embodiments, explanation is performed as an example that each of the first to eighth rear sprockets 28a-28h, for example, the inner periphery 48 of each of the first to eighth rear sprockets 28a-28h, is mounted to each of the first to eighth step portions 33a-33h and each of the first to eighth mounting portions 42a-42h.

Figure 9A:
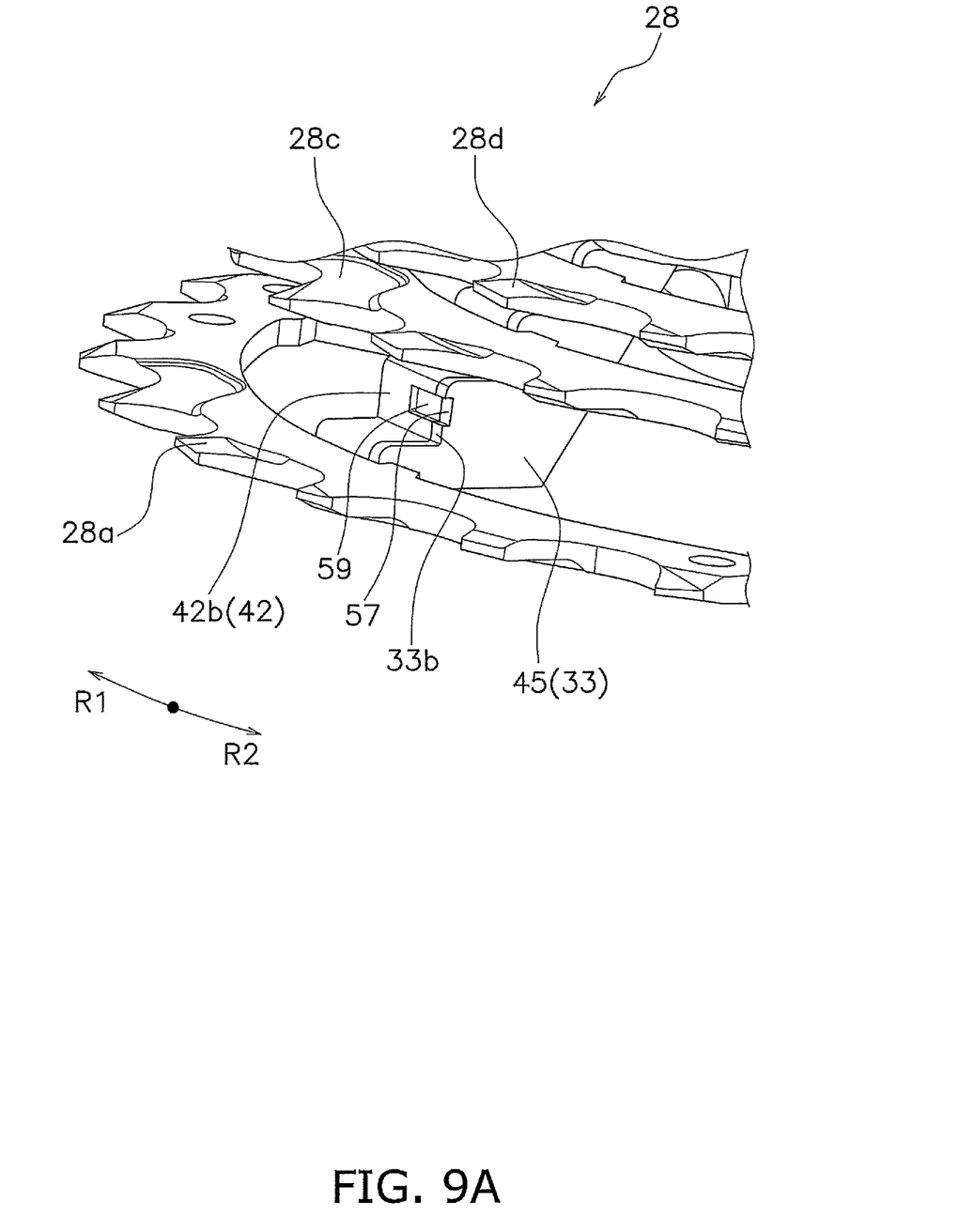
FIG. 9A is a partially enlarged perspective view from outside of the bicycle rear sprocket assembly as a variation of the embodiment of the present invention.
Figure 9B:
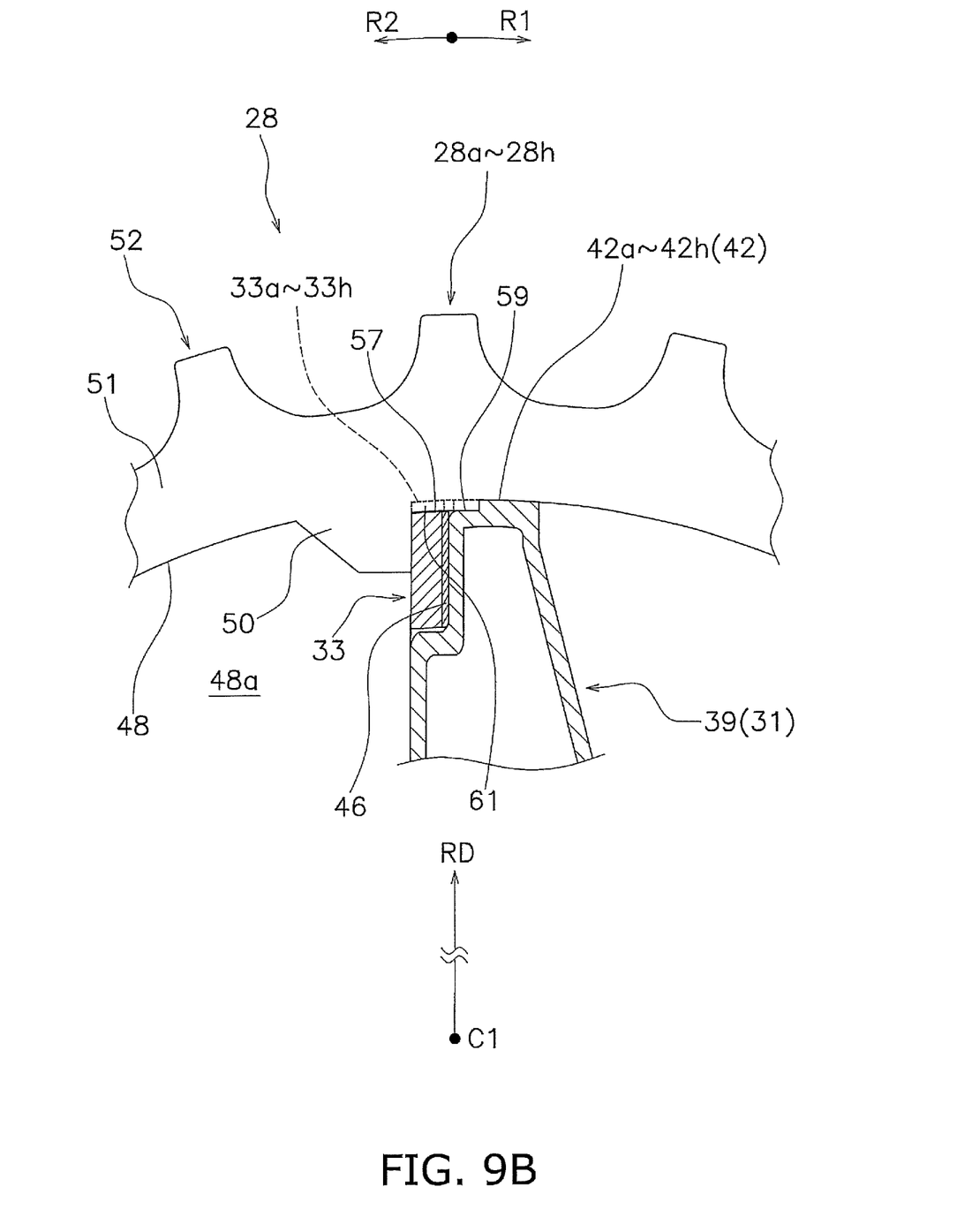
FIG. 9B is a partially enlarged cross-sectional view from front side of the bicycle rear sprocket assembly as a variation of the embodiment of the present invention.

Instead of this, as shown in FIGS. 9A and 9B, each of the first to eighth step portions 33a-33h can include at least one first positioning recess 59. Each of the first to eighth mounting portions 42a-42h can include at least one second positioning recess 57. In this case, each of the positioning protrusions 61 is disposed in the first and second positioning recess 57, 59.

General Interpretation of Terms

In understanding the scope of the present disclosure, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps.

The foregoing also applies to words having similar meanings such as the terms, "including", "having" and their derivatives. Also, the terms "part," "section," "portion," "member" or "element" when used in the singular can have the dual meaning of a single part or a plurality of parts.

Also as used herein to describe the above embodiment(s), the following directional terms "forward", "rearward", "above", "downward", "vertical", "horizontal", "below" and "transverse" as well as any other similar directional terms refer to those directions of the bicycle rear sprocket assembly.

Accordingly, these terms, as utilized to describe the present technology should be interpreted relative to the bicycle rear sprocket assembly.

The term "configured" as used herein to describe a component, section, or part of a device implies the existence of other unclaimed or unmentioned components, sections, members or parts of the device to carry out a desired function. The terms of degree such as "substantially", "about" and "approximately" as used herein mean a reasonable amount of deviation of the modified term such that the end result is not significantly changed.

While only selected embodiments have been chosen to illustrate the present technology, it will be apparent to those skilled in the art from this disclosure that various changes and modifications can be made herein without departing from the scope of the technology as defined in the appended claims. For example, the size, shape, location or orientation of the various components can be changed as needed and/or desired.

Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time.

Every feature which is unique from the prior art, alone or in combination with other features, also should be considered a separate description of further technologies by the applicant, including the structural and/or functional concepts embodied by such feature(s).

Thus, the foregoing descriptions of the embodiments according to the present technologies are provided for illustration only, and not for the purpose of limiting the technology as defined by the appended claims and their equivalents.

What is claimed is:

1. A bicycle sprocket assembly comprising:
   a sprocket carrier made of a non-metallic material, the sprocket carrier including a central base and at least one mounting arm extending radially outwardly from the central base with respect to a rotational center axis of the bicycle sprocket assembly, the at least one mounting arm having a first circumferentially facing surface and a second circumferentially facing surface opposite to the first circumferentially facing surface in a circumferential direction with respect to the rotational center axis;
   at least one metallic support attached to at least one of the first circumferentially facing surface and the second circumferentially facing surface of the at least one mounting arm; and
   at least one sprocket made of a metallic material, the at least one sprocket including a sprocket body and a plurality of sprocket teeth extending radially outwardly from the sprocket body with respect to the rotational center axis, the sprocket body being attached to the at least one metallic support.

2. The bicycle sprocket assembly according to claim 1, wherein
   the first circumferentially facing surface of the at least one mounting arm faces a reverse direction of a rotational driving direction of the sprocket assembly;
   the at least one metallic support is attached to the first circumferentially facing surface of the at least one mounting arm.

3. The bicycle sprocket assembly according to claim 2, wherein
   the second circumferentially facing surface of the at least one mounting arm is free of a metallic support.

4. The bicycle sprocket assembly according to claim 1, wherein
   the at least one mounting arm includes a plurality of mounting arms;
   the at least one metallic support includes a plurality of metallic supports; and
   each of the plurality of metallic supports is attached to each of the plurality of mounting arms.

5. The bicycle sprocket assembly according to claim 4, wherein
   the plurality of mounting arms are spaced apart from each other at even intervals in the circumferential direction.

6. The bicycle sprocket assembly according to claim 1, wherein
   the at least one sprocket includes a plurality of sprockets.

7. The bicycle sprocket assembly according to claim 6, wherein
   the plurality of sprockets include at least one first sprocket made of a first sprocket material and at least one second sprocket made of a second sprocket material that is different from the first metallic material.

8. The bicycle sprocket assembly according to claim 1, wherein
   the at least one metallic support includes at least one first metallic support made of a first support material and at least one second metallic support made of a second support material that is different from the first support material.

9. The bicycle sprocket assembly according to claim 8, wherein
   the at least one first metallic support is adjacent to the least one second metallic support in an axial direction with respect to the rotational center axis.

10. The bicycle sprocket assembly according to claim 8, wherein
    the plurality of sprockets include at least one first sprocket made of a first sprocket material and at least one second sprocket made of a second sprocket material that is different from the first metallic material.

11. The bicycle sprocket assembly according to claim 10, wherein
    the first sprocket material is identical with the first support material; and
    the second sprocket material is identical with the second support material.

12. The bicycle sprocket assembly according to claim 11, wherein
    the first sprocket material and the first support material include titanium; and, the second sprocket material and the second support material include iron.

13. The bicycle sprocket assembly according to claim 1, wherein
the at least one sprocket is indirectly attached to the sprocket carrier through the at least one metallic support.

14. The bicycle sprocket assembly according to claim 1, wherein
the at least one sprocket has an inner periphery defining a sprocket opening;
the at least one sprocket includes at least one radial protrusion extending radially inwardly from the inner periphery with respect to the rotational center axis;
the at least one radial protrusion is attached to the at least one metallic support.

15. The bicycle sprocket assembly according to claim 14, wherein
the at least one radial protrusion includes a plurality of radial protrusions spaced apart from each other at even intervals in the circumferential direction.

16. The bicycle sprocket assembly according to claim 1, wherein
the at least one of the first circumferentially facing surface and the second circumferentially facing surface of the at least one mounting arm has at least one attachment recess;
the at least one metallic support is disposed in the at least one attachment recess.

17. The bicycle sprocket assembly according to claim 1, wherein
the at least one mounting arm has an internal cavity.

18. The bicycle sprocket assembly according to claim 1, wherein
the central base of the sprocket carrier has a hub engagement profile.

19. The bicycle sprocket assembly according to claim 1, wherein
the sprocket carrier is made of a carbon fiber reinforced plastic.

20. The bicycle sprocket assembly according to claim 1, wherein
the sprocket body is attached to the at least one metallic support by one of laser welding, adhesive and diffusion bonding.

* * * * *